United States Patent [19]

Kurtgis

[11] Patent Number: 4,478,312

[45] Date of Patent: Oct. 23, 1984

[54] SYSTEM AND PORTABLE CAGE FOR SERVICING POWER TRANSMISSION LINES

[76] Inventor: Michael P. Kurtgis, 4651 Sheridan St., Hollywood, Fla. 33021

[21] Appl. No.: 428,595

[22] Filed: Sep. 30, 1982

[51] Int. Cl.³ .............................................. E04G 3/10
[52] U.S. Cl. ..................................... 182/142; 182/150
[58] Field of Search ................... 182/142, 10, 11, 150, 182/145, 191, 192, 193, 13, 14

[56] References Cited

U.S. PATENT DOCUMENTS

| | | | |
|---|---|---|---|
| 422,345 | 2/1890 | Harman | 182/11 |
| 836,995 | 11/1906 | Schroeder | 182/10 |
| 844,641 | 2/1907 | Yeakel et al. | 182/13 |
| 900,713 | 10/1908 | Dye | 182/11 |
| 3,176,795 | 4/1965 | Taylor | 182/145 |
| 3,702,124 | 11/1972 | Highland | 182/14 |
| 4,163,480 | 8/1979 | Highland | 182/14 |
| 4,243,118 | 1/1981 | Landry | 182/3 |

FOREIGN PATENT DOCUMENTS 162190 11/1955 Sweden ................... 182/10

*Primary Examiner*—Reinaldo P. Machado
*Assistant Examiner*—Alvin Chin-Shue
*Attorney, Agent, or Firm*—Malin, Haley & McHale

[57] ABSTRACT

A portable cage and system for servicing high voltage power transmission lines, including a uniquely shaped cage lowerable onto a power line bundle of one or more conductors, the cage placeable by an ungrounded helicopter or a ground-based crane from a position above the power transmission lines lowered thereonto. Workmen may then safely move about within each basket to complete the required power line repair. The cage includes a horizontal crossframe and two baskets each connected to and downwardly hung from the crossframe, the entire cage having a unique, generally inverted "U"-shape when viewed from either end of the cage. The cage may include adjustable connector engagement wheels which contact each power line in the bundle for support and lateral movement of the cage. These wheels are connected to the crossframe such that the two basket portions of the cage hang on either side of the power line bundle, again aided by the generally inverted "U"cross-sectional shape. When wheels are included as part of the cage, brake and propulsion means are also included as part of the cage. When the cage is made movable on the power lines by the addition of wheels, a means for traversing the cage over hardware attached to the power lines may also be made a part of the cage. While supported on the power line bundle, the entire cage becomes energized to the same voltage potential as that of the power line bundle.

3 Claims, 9 Drawing Figures

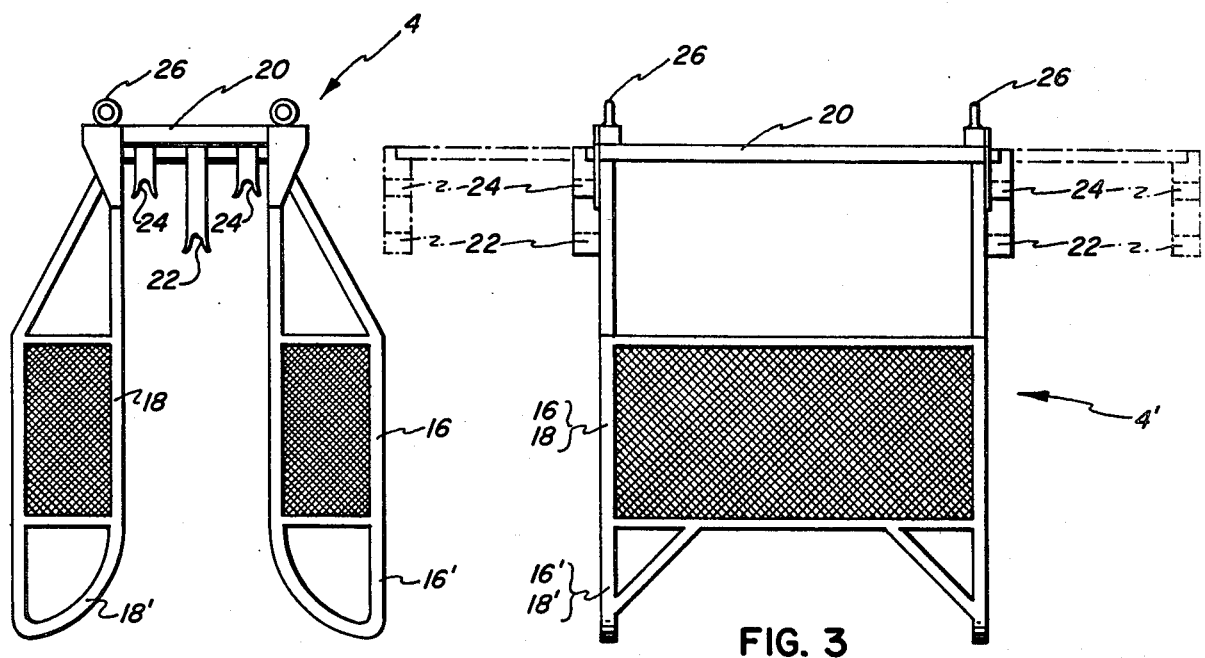
FIG. 2
FIG. 3
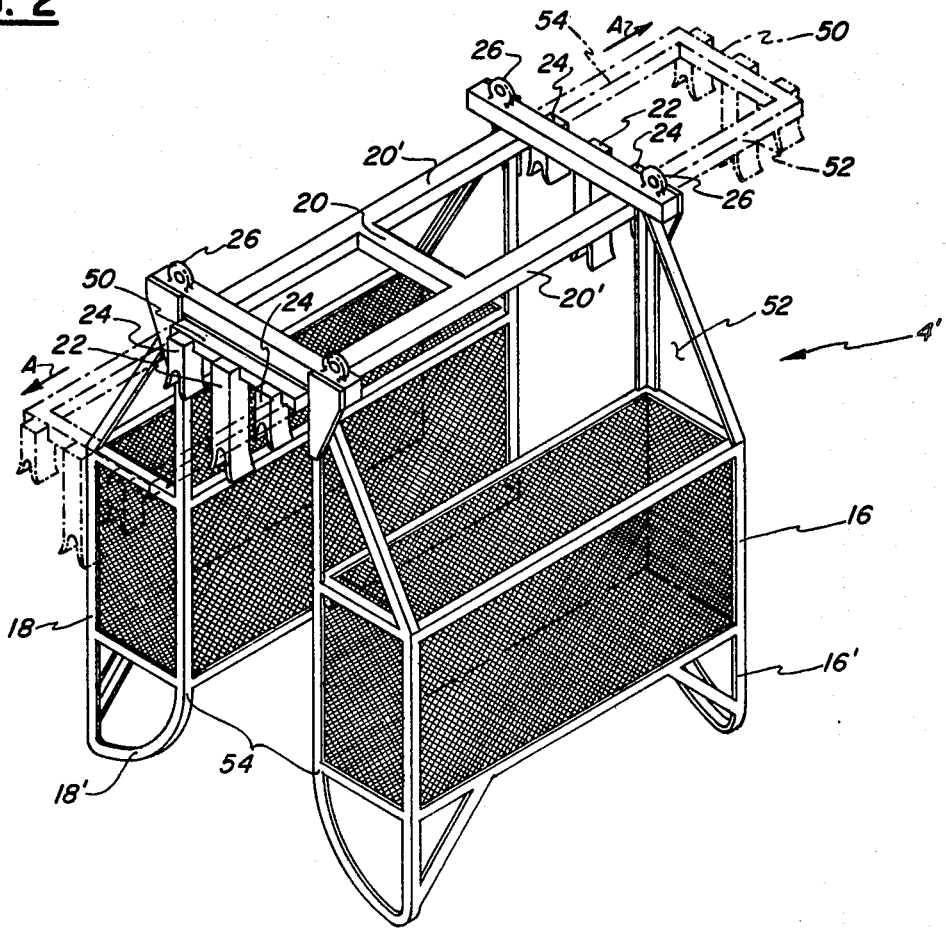
FIG. 4

SYSTEM AND PORTABLE CAGE FOR SERVICING POWER TRANSMISSION LINES

BACKGROUND OF THE INVENTION

This invention relates generally to the servicing of high-voltage power lines and more particularly to a novel system for placing workmen in close proximity to a bundle of power lines to be repaired.

Electrical power is provided to the consumer over long distances by the utilization of high voltage lines which have the capacity of carrying voltage varying from 5 kilovolts (kv.) to 500 kv., and higher. Ultimately this high voltage is stepped-down for use by the consumer. In order to convey this voltage over long distances it is necessary and economical to utilize high voltage power lines.

The standard high voltage A.C. transmission line system will utilize three phases of conductors, and, if more than one conductor is used per phase, the group of conductors is called a bundle, supported generally parallel to one another, each carrying voltage 120° out of phase to each other.

These high voltage lines are generally supported by structures varying from simple wooden poles with cross bars to extremely tall metal towers. As the demand for electricity over greater distances has increased, the trend has been to the higher capacity power lines of 240 HV and EHV 500 kv. and above which incorporate extremely tall lattice towers or tubular steel structures in excess of 75 feet and may extend up to 300 feet high for support. These power line support structures or towers generally utilize three types of insulating configurations for supporting the conductors consisting of individual porcelain covered discs which interconnect to form chains or strings of varying lengths. These insulator strings, as they are commonly referred to, are suspended from the towers either vertically, horizontally or a V-shape formed by two strings. These strings function to provide stand off air gap distances between the high voltage power lines and the tower structure which is grounded. This air gap distance is required to prevent the high power voltage line from arcing to the grounded support structure over the distance provided by the insulated strings referred to as insulator string flash-over. Arcing may be a relatively harmless discharge or transfer between two differing ungrounded potentials to equalize the voltage. If neither of the potentials are grounded there is no fault current. This ungrounded discharge between differing potentials will generally not occur unless they are very close together, usually a matter of inches, and typically up to 1.5 feet with extra high voltage lines of 500 kv and above. These types of discharges are generally not hazardous to personnel or structures since minimal current flow occurs.

The more serious and lethal discharge is the fault discharge between differing potentials, one of which is grounded. The fact that one potential is grounded creates a greater stress on the insulating medium, whether it be the insulating string or an air gap to convey the charge of the power line to the grounded object. In order to prevent this type of flash-over, a greater distance must be maintained between the differing potentials, as in this case the distance between the power line to any structure or object, whether it be a man, vehicle or the tower that is grounded.

Prior art discloses several wire cable, or conductor supported skips or worker support cages. An early U.S. Pat. No. 900,713 discloses an unmotorized cable way including a pair of baskets which alternately act by gravity to convey people or objects across an open span. An earlier U.S. Pat. No. 844,641, specifically discloses a manually-propelled lineman's chair for supporting a single workman onto a telephone line or the like for repairing existing lines or installing new parallel lines. This invention is limited to traversing from pole to pole with no attention in the invention to means for conveying the device beyond or around a pole. The worker therein is supported by a seat without any surrounding guards.

A later U.S. Pat. No. 3,702,124 also discloses a traversing manually or power propelled skip which is supported on two parallel power lines. The skip includes a caged basket which hangs directly under the power lines for safely supporting a workmen therein.

Likewise, U.S. Pat. No. 4,163,480 also discloses a line traversing skip which is supported by and traverses on at least one pair of power lines. Therein also the workmen supporting cage is hung directly below the power lines which support the device.

These last two above disclosures include means for moving these devices over any hardware connected to the lines, but do not include specific means for placing on or removing the devices from the supportive power lines. Typically, prior art discloses that the only means for lifting these cages or skips up onto the bundle of conductors is by ground-based crane or by block-and-tackle supported by the structure or conductors, the cage then hoisted up from beneath the conductors thereonto. Wheels or rollers that engage the conductors fold or swing out of the way until the cage is in position relative to the conductors, after which they are unfolded or swung back. Further, because the crane is grounded, this operation must be done only after power flow is interrupted.

This inventor is aware of two now commercially available cages for servicing power lines. These cages, or conductor carts as they are generally referred to in the catalog, are manufactured by Sherman & Reilly, Inc., of Chattanooga, Tenn. and are available in three models: manual, full power and single conductor. All of these cages place the workmen underneath or in between the transmission lines. Further, elaborate and expensive means are incorporated in both the manual and full power models for moving the support rollers and attached brackets out of the way of the power lines as the cages are crane-raised or block-and-tackle hoisted from beneath into position on the conductors.

The instant invention provides novel twin-workman-supportive baskets as part of the cage, which baskets hang, not directly below the support cables which may require repair, but laterally outward and slightly below the power lines in a unique generally inverted "U" cross-sectional shape to better facilitate repairs and to allow opposing workmen, at least one in each basket, to simultaneously work on adjacent repairs or to opposingly assist one another on specific repairs. Where only one workman is required, a dead-weight counter-balance may be placed in the other basket. From a point in space directly above the conductors, this cage may be lowered onto the bottom phase conductor or ground wire when other conductors are positioned directly above the objective conductor. This "U"-shape also facilitates lowering the cage directly onto the bundle of conductors without need for any disassembly or reassembly of the cage. This invention also includes at least one elongated insulated safety link as part of a support or lifting harness which allows the cage to be portably moved about, onto, and from power lines by helicopter or ground-based crane with workmen in the twin cages without fear of significant current transfer to the workmen or the helicopter or crane while working on energized power lines.

BRIEF DESCRIPTION OF THE INVENTION

The invention provides an improved portable dual-basket cage and system for servicing power lines. The dual baskets oppose one another and are positioned downward and spaced apart further than the supportive power lines in a generally inverted "U"-shaped cross-section to facilitate ease of line repair. This cage is made portable by including a lifting harness which has at least one elongated insulated link therein when working on energized power lines. Because of this insulated link, a helicopter, ground-based crane or other lifting means whether grounded or ungrounded may be used to lift and place the cage onto an energized power line bundle without fear of grounding the energized cage with workmen therein or connecting the helicopter to a high voltage potential, any of which would otherwise have tragic results. The helicopter is the preferred cage lifting means because of the relative ease of placing and conveying the cage. Rollers to engage the conductor wires, a brake, and propulsion means may also be added to the cage to implement lateral movement of the cage after being placed onto the power lines. When rollers are added in place of skids, means for traversing the cage over hardware attached to the power lines may also be included as part of the cage. In one alternate embodiment, the rollers positioned on centerline of the cage cross-frame are made foldable to accommodate traversing hardware or use on two- and four-line bundles. When four-line bundles are encountered and the center rollers are moved out of the way, additional removable wheels may be repositioned on the cage so that all conductors in the bundle support the cage and thereby maintain the design spacing relationship between the conductors.

It is therefore an object of this invention to provide a portable cage and system for servicing high voltage power transmission lines, made portable by an insulated lifting harness which allows the cage to be safely lowered onto the conductor bundles by either helicopter or ground-based crane.

It is still another object of this invention to provide a dual-basket portable cage and system which places workmen diagonally downward and outward from the power lines on which the cage is supported to facilitate independent or opposingly assisted line repairs.

It is yet another object of this invention to provide a portable power line servicing cage system which is movably supported on at least one power line conductor.

And a still further object of this invention is to provide a portable cage system for servicing power lines which includes removable power line engagement roller wheels to accommodate different power line bundle geometries.

In accordance with these and other objects which will be apparent hereinafter, the instant invention will now be described with particular reference to the accompanying drawings.

BRIEF DESCRIPTION OF THE DRAWINGS

FIG. 2 is an elevation end view of one embodiment of the cage.

FIG. 3 is an elevation side view of a second embodiment of the cage.

FIG. 4 is a perspective view of the second embodiment of the cage.

PREFERRED EMBODIMENT OF THE INVENTION

Figure 1:
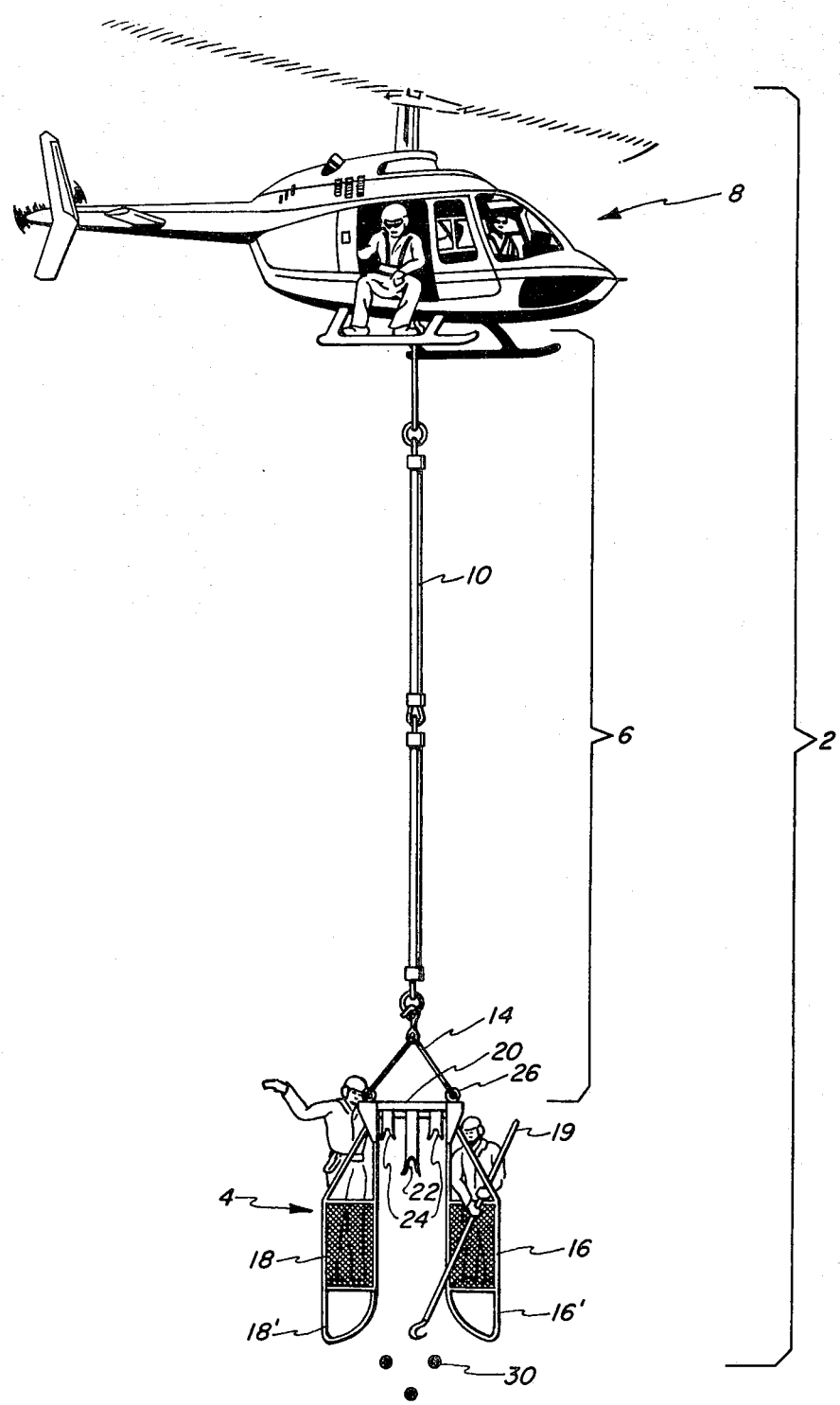
FIG. 1 is a perspective view of the entire invention showing a helicopter as the lifting means.

Referring now to the drawings and firstly to FIGS. 1 through 4, this system is shown generally at 2 and includes the improved cage 4, a helicopter 8 as the preferred cage lifting means which has a standard hoisting and/or lifting hook attached into the body of the helicopter, and a lifting harness 6. When this system is used in conjunction with energized power lines, the lifting harness 6 includes one or more insulating links 10 connected serially when additional insulator length is required. These insulating links 10 may be those available from A. B. Chance Co., identified as strain poles having various lengths and end configurations, or any other non-conducting material such as rope.

The lifting harness 6 also includes a bridle 14 which is attachable to padeyes 26 attached to the cage crossframe 20. In one embodiment, skids 22 and 24 are attached to the lower side of the crossframe 20 for engagement to and electrical interconnection between the cage and the power lines. These skids 22 and 24 have flared sides to enlarge the lower opening to facilitate positioning the cage properly over the bundle of conductors. The skids also serve as a built-in brake in that, once the cage is placed onto the power line bundle by the helicopter, no further lateral movement along the length of the power lines occurs.

The cage 4 also includes baskets 16 and 18 attached to the crossframe 20 for safely and securely carrying workmen therein. The baskets 16 and 18 are offset horizontally away from the skids by the shape of basket upper frames 20, 20' such that sufficient clearance is provided at opening 54 to receive the bundle of conductors therethrough as the cage is lowered. To further facilitate ease of proper alignment of the cage over the bundle, the lower portions 16' and 18' of the baskets 16 and 18 are outwardly contoured. And in extremely difficult weather conditions, workmen are provided with conductor poles 19 to grab one of the conductor lines in a bundle to help stabilize the hanging cage from spinning.

As shown in FIGS. 3 and 4, when workmen must install armor rods which are longer than the cage, an alternate embodiment of the cage 4' includes a telescoping crossframe whereby the end pieces 50 carrying the skids telescope longitudinally in direction A, supported by rods 52 which slide and are supported within the side pieces 20' of the cage 4'.

Figure 5:
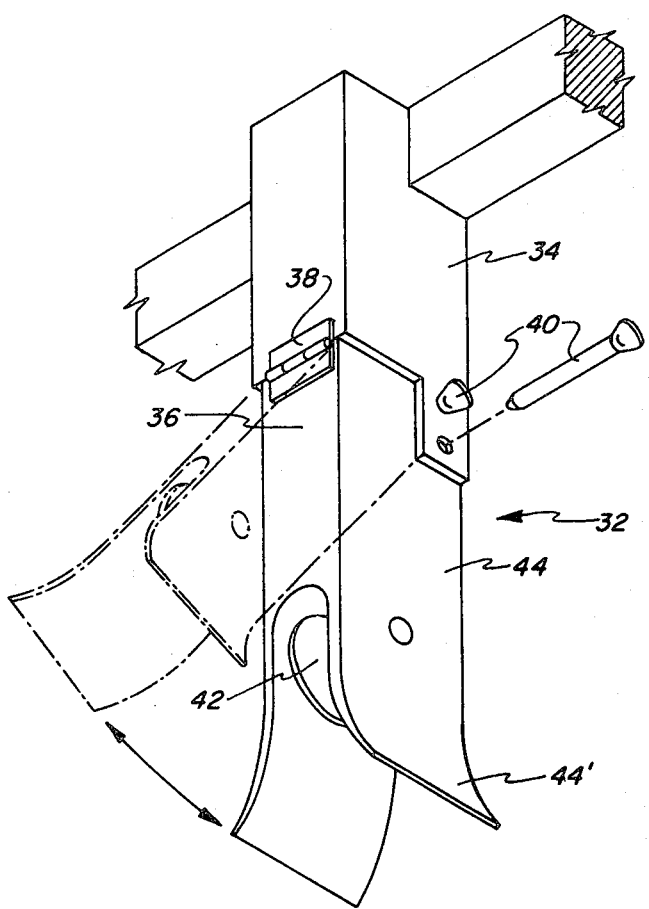
FIG. 5 is a perspective view of an alternate embodiment of the center rollers.

An alternate embodiment, including both the center cage support 32 and a wheel or roller 42, is shown in FIG. 5. The center cage support 34 may be folded out of the way when there is no middle conductor line in the bundle or when traversing the cage over certain hardware attached to the power lines. This folding is easily accomplished by removing a locking pin 40 and pivoting the lower portion 36 of the center cage support 32 about hinge 38. The roller housing portion 44 is also flared outwardly at 44' to increase the conductor line access to the roller.

Figure 6:
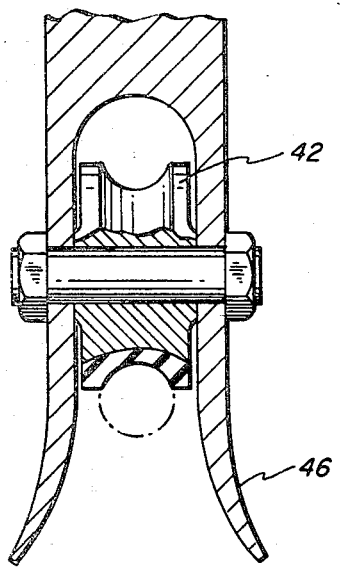
FIG. 6 is an elevation end view of a typical roller.

A side cage support 46 having a roller 42 in place of the skid is shown in FIG. 6. The sides of the lower portion of this side cage support 46 are also flared outwardly to increase the power line access opening 48.

Figure 7:
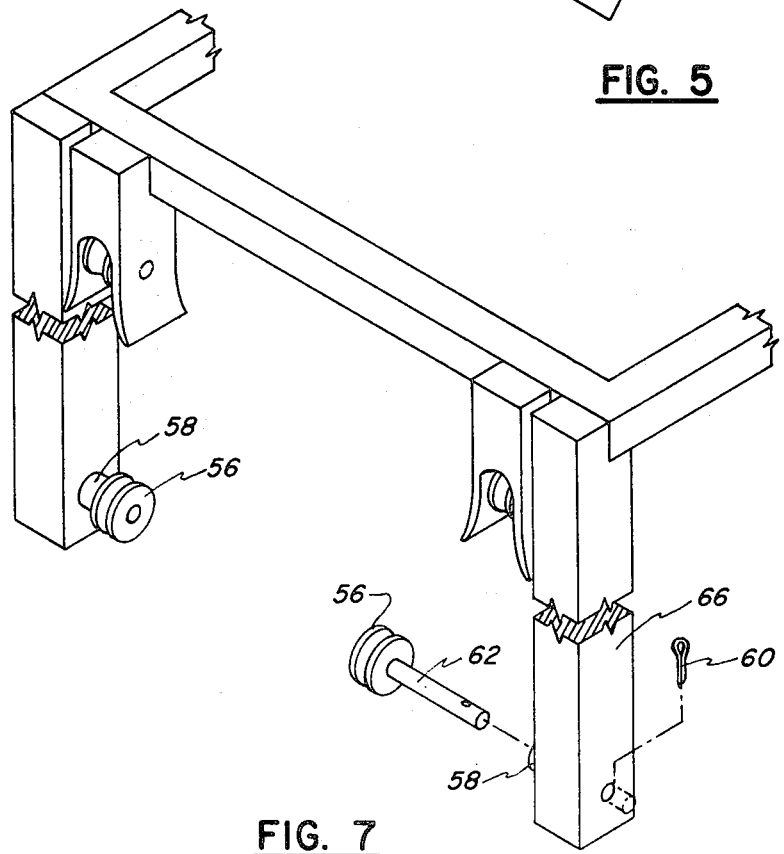
FIG. 7 perspective view of an optional removable lower roller.

To service four-line transmission systems wherein the conductors form a rectangle in cross-section, it is important that the upper conductors not be stretched separately by weight of the cage. A removeable lower cage support roller 56 is shown in FIG. 7, one support roller insertable along each vertical edge 66 of the cage. The mounting shaft 62 is insertable into a support collar 58 and thereafter pinned in place by pin 60. Even pressure on all four conductor lines is virtually assured by locating these collars 58 a proper distance below the outer rollers attached to the crossframe corresponding to and maintaining conductor spacing.

All rollers used optionally in place of skids effect electrical interconnection between the power line conductors and the cage. When rollers are employed, a brake is also required (not shown) to maintain a chosen position for work. A means for propelling the cage (not shown), whether manual or power, may also be provided to move the cage laterally along the power lines. Rollers may then include means for traversing the cage over hardware connected to the power line bundle. Such rollers are well known in this art.

Figure 8:
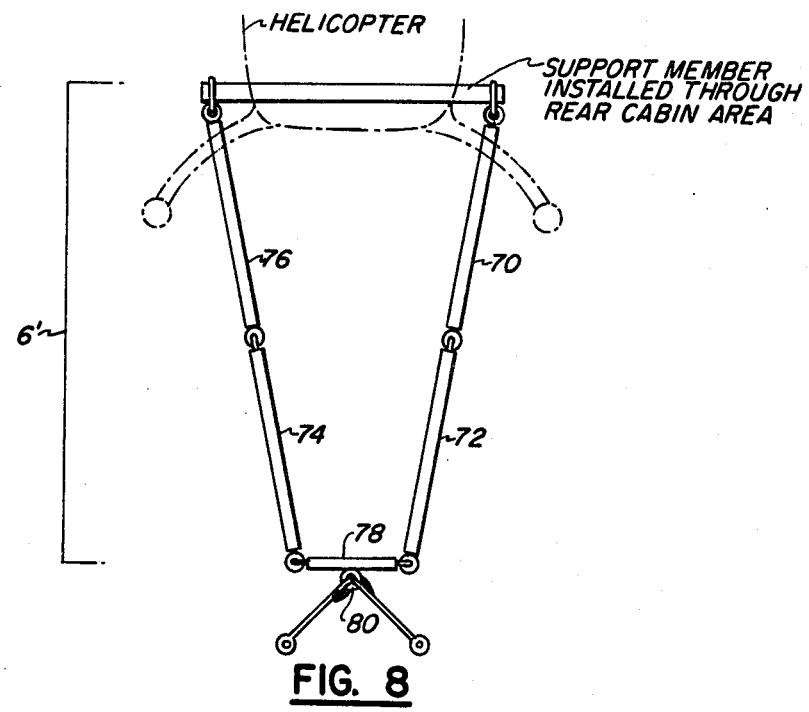
FIG. 8 is an elevation end view of the preferred embodiment of the lifting harness.

Referring now to FIG. 8, an alternate and preferred lifting harness 6' is shown attached to a helicopter. This harness embodiment includes two support strands, the first comprised of insulated link segments 70, 72; the second, of insulated link segment 74,76. These insulated link segments 70 and 72 are connected at their lower ends by a horizontal intermediate link 78 which may also be insulated. The intermediate link 78 has an attaching ring 80 which interconnects to the bridle 14. By this arrangement, additional lateral stability is provided by this trapezoid configuration as the cage is lowered onto the conductors.

Figure 9:
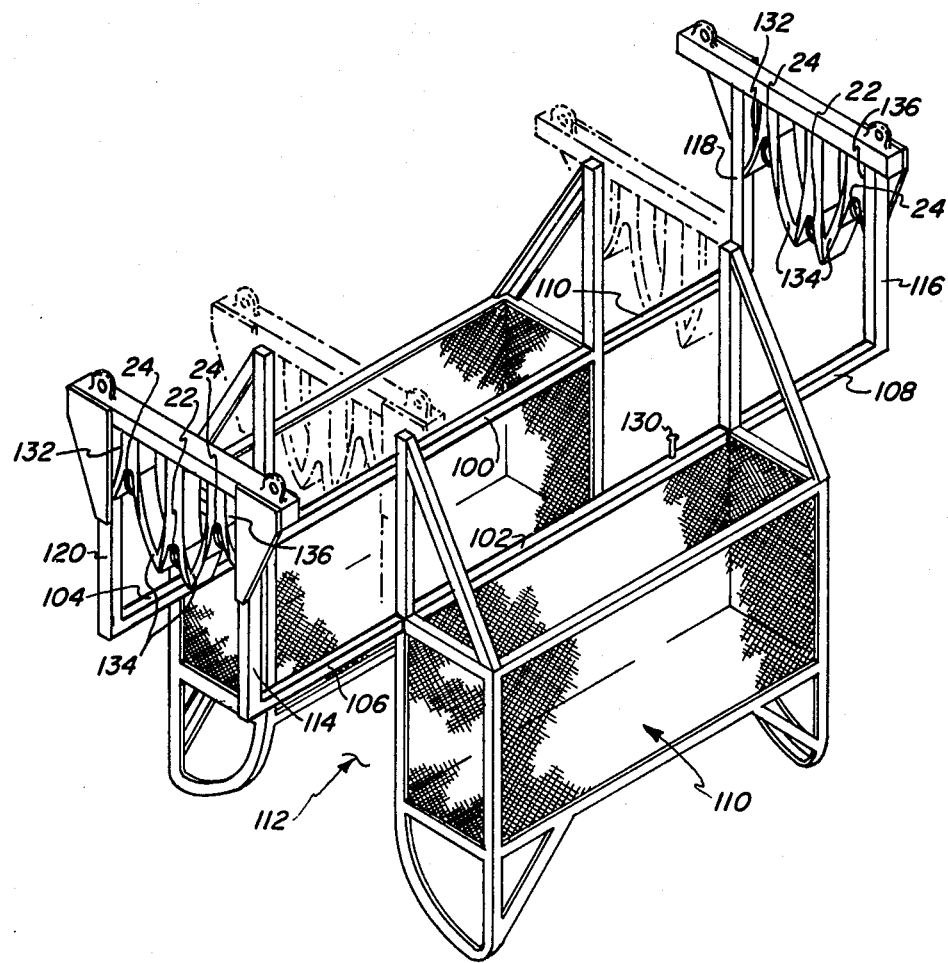
FIG. 9 is a perspective view of a third embodiment of the cage.

In FIG. 9 is shown another alternate and preferred cage 4" which generally provides the previously described telescoping feature and, additionally, provides a clearer work area above and between the baskets. This embodiment includes crossframes 114 and 116 which have slideably interconnecting channels 104, 106, 108, and 110 into the basket frames 100 and 102. The configuration of the baskets 110 and 112 are generally as previously described. Locking of the crossframes 114 and 116 after lateral adjustment in relation to one another and the baskets is accomplished by locking pins 130 inserted through aligned holes in the basket frame and channels 104, 106, 108 and 110 therein. An alternate means of guiding the conductors to the rollers is also shown in this figure and includes guides 132, 134 and 136 attached to the crossframe adjacent the rollers. By these guides, the conductors are controllably guided directly to the roller, even if the previously described flared portions of the roller supports are deleted.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. A skip adapted to be lifted by a lifting means onto a plurality of suspended wires, said skid being adapted to be supported by said plurality of said suspended wires, said skid comprising:

one or more basket means for holding and supporting men or material, a cross frame rigidly and supportingly attached to each of said one or more basket means, said cross frame comprising a plurality of skids, each skid of said plurality of said skids being adapted to locate over and partially around one wire each of said plurality of wires if said skid were lowered onto said plurality of wires, a harness means for lifting said skid, said harness means being attached to said cross frame, said harness means being adapted to be attached to said lifting means, whereby said lifting means is effective to lift said skid by said harness means above said plurality of suspended wires and lower said skid onto said plurality of suspended wires, each said skid located over and partially around one wire of said plurality of suspended wires so as to support said skid, and whereby said skid hangs from said wires, and wherein various wires of said plurality of suspended wires lie in a plurality of horizontal planes, and various of said skids are located in different horizontal planes, said different horizontal planes selected so that said skids are effective to mount said skip to said plurality of suspended wires.

2. The skip of claim 1 wherein said skips comprise a pair of vertically disposed, outwardly flared, members adapted to facilitate location of said each skid around the sides of said one wire, each of said plurality of suspended wires if said skid were hanging from said plurality of suspended wires, and said frame comprises first and second members, said first member being attached to said harness means, said second member located telescopically and slidingly within said first member, said second member constituting means for extending the horizontal length of said frame, and said harness means comprises at least two padeyes attached to said frame, a bridle attached to said padeyes, an elongate member having one or more sections of electrical insulating material, said elongate member supportingly attached at one end to said bridle, and at said elongate member's other end to said lifting means.

3. A skip adapted to be lifted by a lifting means onto a plurality of suspended wires, said skid being adapted to be supported by said plurality of said suspended wires, said skid comprising:

one or more basket means for holding and supporting men or material, a cross frame rigidly and supportingly attached to each of said one or more basket means, said cross frame comprising a plurality of skids, each skid of said plurality of said skids being adapted to locate over and partially around one wire each of said plurality of wires if said skid were lowered onto said plurality of wires, a harness means for lifting said skid, said harness means being attached to said cross frame, said harness means being adapted to be attached to said lifting means, whereby said lifting means is effective to lift said skid by said harness means above said plurality of suspended wires and lower said skid onto said plurality of suspended wires, each said skid located over and partially around one wire of said plurality of suspended wires so as to support said skid, and whereby said skid hangs from said wires, and wherein said frame comprises first and second members, said first member being attached to said harness means, said second member located telescopically and slidingly within said first member, said second member constituting means for extending the horizontal length of said frame.

* * * * *